2 Sheets—Sheet 1.
J. ELLS.
Revolver.
No. 265. A. I. Patented Feb. 21, 1860.
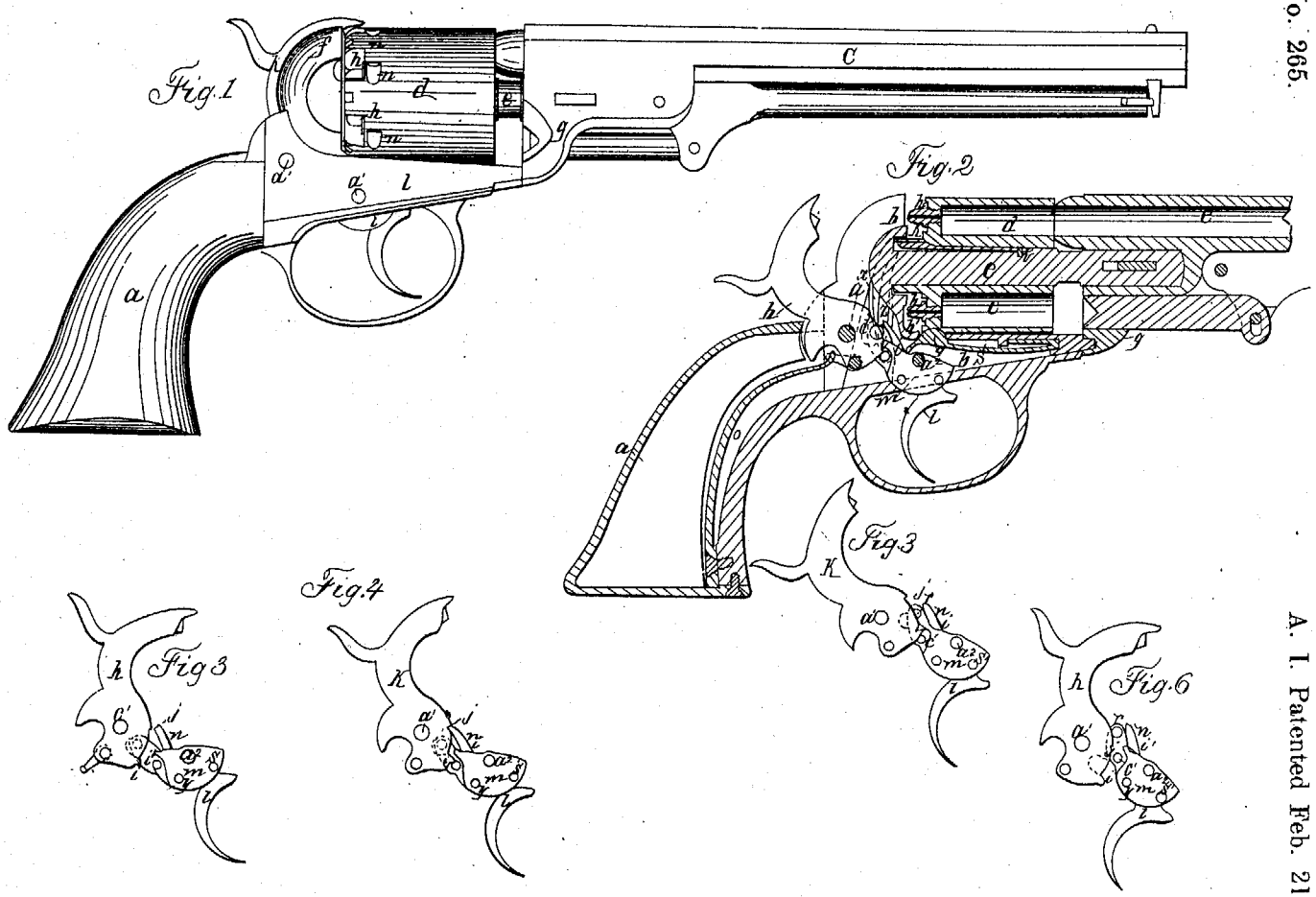
Witnesses:
J. Bakewell
Martin G. Bushing
Inventor
Josiah Ells
N. PETERS, PHOTO-LITHOGRAPHER, WASHINGTON, D. C.

2 Sheets—Sheet 2.
J. ELLS.
Revolver.
No. 265.
A. I Patented Feb. 21. 1860.
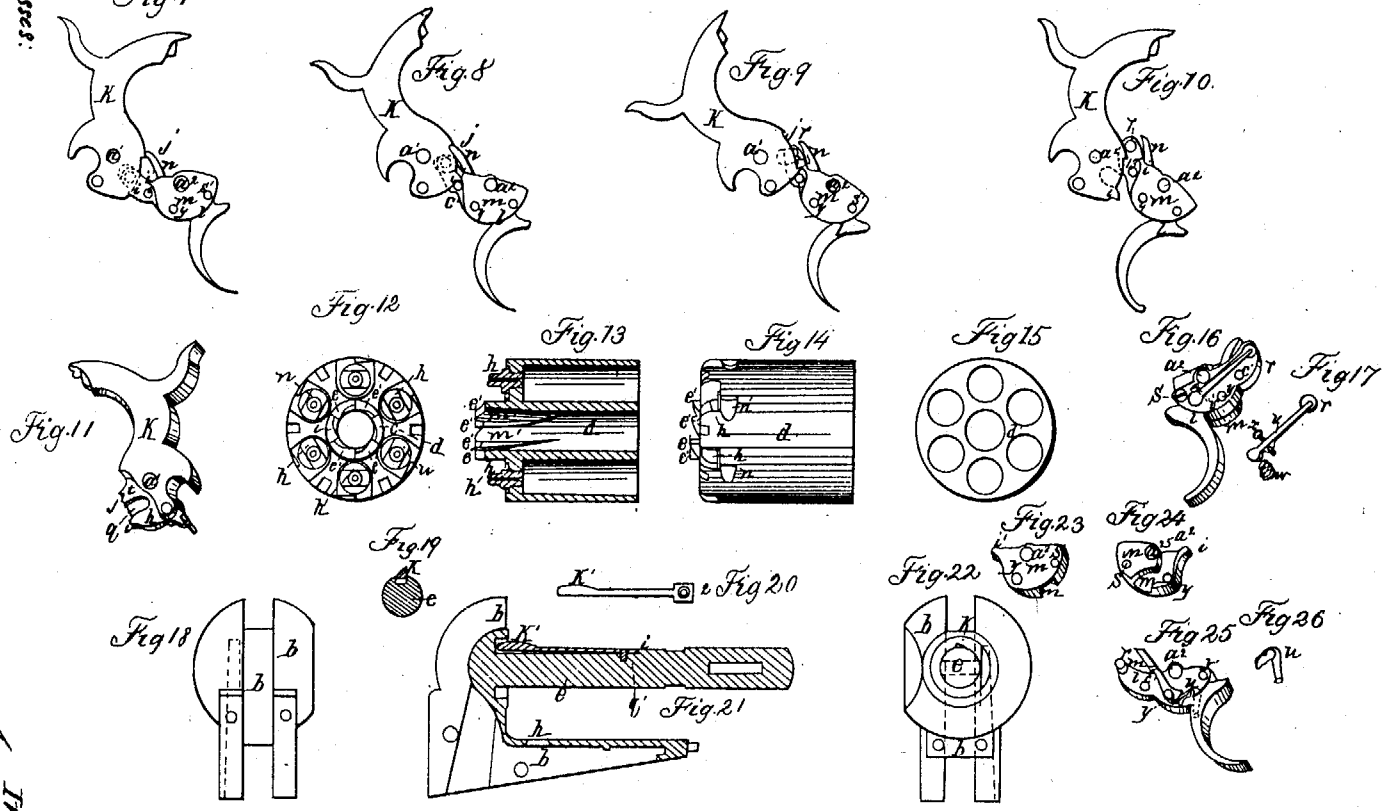
Witnesses:
J. Bakewell
Martin Glashing
Inventor:
Josiah Ells

UNITED STATES PATENT OFFICE.

JOSIAH ELLS, OF PITTSBURG, PENNSYLVANIA, ASSIGNOR TO JAS. M. COOPER AND WM. S. LAVELY.

IMPROVEMENT IN REVOLVING FIRE-ARMS.

Specification forming part of Letters Patent No. 11,419, dated August 1, 1854; Reissue No. —, dated September 6, 1859; Additional Improvement No. 265, dated February 21, 1860.

*To all whom it may concern:*

Be it known that I, JOSIAH ELLS, of Pittsburg, in the county of Allegheny and State of Pennsylvania, have invented certain new and useful Improvements in that class or description of Fire-Arms known as "Revolvers," being an improvement of the invention for which Letters Patent of the United States were granted to me on the 1st day of August, A. D. 1854; and I do hereby declare that the following is a full, clear, and exact description thereof, reference being had to the annexed drawings, forming part of this specification.

My improvements consist in a peculiar construction and arrangement of the operating parts of the lock of a revolving fire-arm, by means of which I am enabled to raise the hammer to half-cock or to full cock, preparatory to firing, and afterward discharge the piece, or at pleasure to fire the piece without pausing at the points of half-cock and full-cock, either by raising the hammer by hand or pulling the trigger, and at the same time by either mode of operation rotating the breech the required distance and securely locking it in position and (if the hammer is raised to full-cock before firing) setting the trigger in a drawn position; also, in the combination of a self-acting spring on the arbor of the spindle which forms the axis of the breech and corresponding ratchets in the bore of the breech, with a spring-stop acting on the external circumference of the revolving breech and operated by the trigger, (whether the fire-arm is operated by hammer or trigger,) for the purpose of securing the breech from the possibility of derangement previous to and at the moment of the discharge.

A further improvement consists in the use of a lever operated by a coiled spring, for the purpose of actuating the vibrating stud in the trigger, as being less liable to derangement and more certain in action than the hair-spring usually employed for that purpose.

To enable others skilled in the art to make and use my improvements, I will proceed to describe their construction and operation.

In the drawings accompanying this specification, Figure 1 is an external side view of a pistol or revolver constructed with my improvements. Fig. 2 is a sectional side view of the stock, breech, and barrel of the pistol seen in Fig. 1, and exhibiting the several parts of the lock in place and in the position they assume when the hammer has been raised to full-cock by the hand of the operator. Figs. 3 to 10 are several views of the hammer and trigger in the various positions they assume in firing the pistol by hammer or by trigger, which will be explained in detail hereinafter. Fig. 11 is a perspective representation of the hammer, showing the side concealed from view in the preceding figures. Fig. 12 is a rear end view of the revolving breech. Fig. 13 is a longitudinal section through the axis of the breech. Fig. 14 is a longitudinal exterior representation of the breech. Fig. 15 is a front end view of the revolving breech. Figs. 16, 17, 23, 24, 25, and 26 are representations in detail of my improved trigger, as hereinafter more fully explained. Fig. 18 is a rear end view of the lock-frame. Fig. 19 is a section of the arbor or spindle on which the revolving breech rotates, the section being made close to the recoil-shield and showing the head of the spring. Fig. 20 represents the spring in the arbor or spindle. Fig. 21 is a sectional side view of the lock-frame with the spindle, which is not shown in section. Fig. 22 is a front end view of the lock-frame and spindle.

In the several figures like letters of reference refer to the same parts of the pistol or lock.

In the drawings, *a* is the stock of the pistol. *b* is the lock-frame. *c* is the barrel, and *d* is the revolving chambered breech. The spindle *e*, attached to and forming part of the lock-frame, projects from the recoil-shield *f*, and, extending through the center of the revolving breech *d*, enters the bracket *g* of the barrel *c* below its bore. The breech *d* revolves freely on the spindle *e*, and the barrel is attached to the lock-frame in any of the usual methods. The nipples or cones *h* are so placed as that when any one is brought to the top of the pistol it will be struck by the hammer when it falls, and the corresponding chamber in the breech is then in exact coincidence with the bore of the barrel.

The hammer *k* is of the shape shown in Figs. 2 and 11, Fig. 2 representing the appearance of one side of the hammer and Fig. 11 of the other side. At the toe of the hammer, on the side seen in Fig. 2, (which, for convenience of description, I shall call the "right side,") is a small projecting cam, *i*, which presses against a corresponding cam, *i'*, in the right side of the trigger, when the pistol is operated by lifting the hammer, as seen in Fig. 8. On the same side of the hammer, a little distance above the cam *i*, is a notch, *j*, in its edge, in which the pawl *n* on the trigger drops to hold the hammer at half-cock, as seen in Figs. 4 and 8. The reverse or left side of the hammer shows a recess, *p*, extending nearly to the hole *a'*, through which passes the hammer-rim, on which the hammer turns. This recess is made to allow the point of the trigger to pass under the toe of the hammer, so that the vibrating stud *r* in the point of the trigger may enter a second recess, *q*, which is cut in the hammer below the level of the first recess, *p*. Above this second recess, on the left side, the hammer is beveled off to its edge, as seen at *t*, so that the vibrating stud *r* may pass over the edge of the hammer until it is projected into the recess *q*, which is made solely for the stud *r* to work in. The hammer is attached to the lock-plate by a hammer-pin at *a'*, Fig. 2, in the usual manner, and is operated by the mainspring *o*.

The trigger *l* (the right side of which is shown in Fig. 2 and in Figs. 3 to 10 and the left side in Fig. 16) is attached to the lock-frame by a trigger-pin at $a^2$, Fig. 2, in the usual manner. The trigger *l* (independently of its pawl and pawl-spring, stud and stud-spring) is made in two pieces.

The principal piece is shown in Fig. 25, and the other piece, *m*, (shown in Fig. 23,) is attached to it by a screw, *s'*, and a pin, *y*. (See Fig. 16.) The piece *m* is made separate, so as to serve as a cap to cover the pawl *n* (see Fig. 25) and its spring *u*. The pawl *n*, of the shape shown in Fig. 25, is pivoted to the trigger by the pin *y*, on which it turns, and its spring *u* (shown separate in Fig. 26) serves to keep it pressed backward toward the point of the trigger. The shape of the cap-piece *m* is seen in Figs. 23 and 24, Fig. 23 showing the external appearance, and Fig. 24 showing the appearance of the side which goes next to the trigger, having a recess, *m'*, for the pawl *n* to work in.

The pawl-spring *u* is kept in place by being slipped into a small hole in the trigger *l*, as shown by dotted lines in Fig. 25. When the cap-piece *m* is fastened to the trigger *l* the trigger presents the appearance shown in Fig. 2 and Figs. 3 to 10. The rear end of the cap-piece *m* has a projecting point, *i'*, forming the cam on the trigger before mentioned, against which the cam *i* on the toe of the hammer operates. Beyond the point of the cam *i'* the trigger extends backward, and at its extremity is the vibrating stud *r*, the rounded end of which projects through the right side of the main piece *l* of the trigger, nearly flush with the face of the cap-piece *m*.

The vibrating stud *r* is constructed as described in the specification to my patent of 1st August, 1854, before referred to, with a flat head, which prevents its falling out of the trigger on the right side, while on the left side (see Figs. 16 and 17) it is kept in place and pressed forward so as to protrude from the other side by a lever, *v*, which is pivoted to the main piece *l* of the trigger by a pin, *x*, (shown in dotted lines in Fig. 16;) and a small coiled spring, *w*, placed in a recess in the trigger, presses outward against the short arm of the lever *v*, and, depressing its long arm, (the point of which rests on the head of the vibrating stud,) gives it its vibrating motion. The advantages of thus substituting a lever and coiled spring for a fine hair-spring to operate the vibrating stud is that dirt getting into the recess under the hair-spring is apt to prevent its action, and that the coiled spring and lever are much stronger and not so liable to be affected thereby; and as the whole action of the lock of the pistol depends on the vibrating stud properly performing its functions, it is very important that it should not be liable to derangement.

The lifter *z* is pivoted to the trigger near its point, on the left side, as shown by dotted lines in Fig. 2, the hole *e'* in the trigger a little below the vibrating stud receiving the pin or pivot of the lifter *z*. The point of the lifter *z* being raised (by drawing back the trigger or by elevating the point of the trigger when the hammer is raised) engages one of the ratchets *c'* on the neck of the rotating breech (see Fig. 14) and causes the requisite degree of rotation of the breech to bring the next in order of the nipples *h* in range with the hammer and the corresponding chamber of the breech in coincidence with the bore of the barrel.

The trigger-spring *s* is constructed substantially as described in Letters Patent of the United States granted to me on 14th April, 1857, the spring *s* passing over the center-pin $a^2$, or point of motion of the trigger, and touching the trigger only at a point in the rear of the trigger-pin $a^2$, where it presses against it with sufficient force to depress the toe of the trigger, and thus cause its reaction after firing. The trigger-spring *s* has a hump, *g'*, near its free end, which, when the trigger is drawn back by hand or set by raising the hammer, enters and protrudes through a corresponding groove, *h'*, in the lock-frame and engages one of the ratchet-grooves *n'* in the circumference of the rotating cylinder, just in front of the cones *k*. (See Fig. 14.) These ratchet-grooves *n'* are so situate that when the edge of one of them presses against the side of the hump *g'* on the trigger-spring it prevents the further forward movement of the cylinder by the lifter *z* and stops it exactly at the point where a chamber in the breech coincides with the bore of the barrel. The height of the hump *g'* on the trigger-spring *s* is such that when the hammer is set at half-cock the hump does not interfere with the ratchet-grooves *n'* on the cylinder; but the hammer being raised (either by hand or by trigger) a little farther, and before it reaches the point of full-cock, the hump enters one of the grooves and prevents the further rotation of the breech until the hammer falls again.

It is manifestly important to prevent the backward as well as the forward rotation of the breech at and shortly before the discharge of the piece. This I effect by means of a spring, $k'$, which is inserted longitudinally in a suitable groove in the top of the arbor or spindle $e$, as shown in Fig. 21. Corresponding with this spring on the arbor are ratchet-grooves $m'$ $m'$ on the inside of the cylinder or breech $d$, the slope of the ratchets on these inside grooves, $m'$, being in a direction opposite to that of the outside grooves, $n'$, so that when the breech $d$ is in place on the spindle $e$ the spring $k'$ comes in contact with the side of one of these inside grooves, $m'$, every time, and at the same moment that a chamber of the breech comes in line with the bore of the barrel, and thus effectually prevents any backward motion of the breech. The effect, therefore, of the combined action of the spring stop or hump $g'$ on the trigger-spring $s$ and the outside grooves, $n'$, and the spring $k'$ on the arbor and the inside grooves, $m'$, is to lock the rotating breech in position every time the hammer is raised above the point of half-cock, and keep it thus locked when the hammer is at full-cock and during the discharge.

Having described the construction and arrangement of the several parts of my improved pistol and the operation of the contrivances for locking the breech, I will proceed to explain the operation of the parts employed in cocking the hammer, setting the trigger, and firing the piece.

Fig. 3 shows the relative position of the hammer and trigger when the parts are at rest and the hammer down, as in Fig. 1, previous to firing. The dotted lines show the position of the end of the trigger behind or on the left side of the hammer, with the vibrating stud projected into the second recess, $q$. Figs. 4 to 6, inclusive, show the various positions when the hammer is raised and the pistol fired by means of the trigger. When the parts are as shown in Fig. 3 and the trigger is drawn part way back, the stud $r$, pressing up against the upper wall of the second recess, $q$, causes the elevation of the hammer until the pawl $n$ enters the notch $j$, at which point (shown in Fig. 4) the hammer will stand at half-cock. A further pull of the trigger, drawing the vibrating stud $r$ forward until it has about half escaped from the second recess, $q$, as seen in Fig. 5, brings the parts into that relative position that the hammer will stand at full-cock, unsupported save by the pressure of the mainspring $o$ and the trigger-springs, which in this position neutralize each other, so that the hammer has no tendency to fall, and the trigger is likewise retained in a drawn position, ready to fire the pistol at a slight touch. So soon as the trigger is further drawn back so far that the vibrating stud $r$ escapes entirely from the hammer the hammer falls by the force of the mainspring and fires the piece. The finger of the operator being then removed from the trigger, it recovers its first position, as at Fig. 3, for repeated action by the vibrating stud slipping over the beveled edge of the hammer at $t$ until it reaches the position shown in Fig. 3, when it is again ready for firing.

Now, it is manifest that although the hammer can thus be made to stand at half-cock or full-cock, and afterward fired by pulling the trigger, it can also, by a single pull of the trigger, be readily fired, if desired, without pausing at half or full cock.

It now remains to explain the operation of the parts when the hammer is employed to cock the piece.

Fig. 7 is similar to Fig. 3, exhibiting the position of the parts before the hammer is raised; and Figs. 8 and 9 show the gradual change in the position of the parts as the hammer is raised by hand previous to firing; and Fig. 10, which is like Fig. 6, shows the position of the parts after the pistol is fired and before the trigger has reacted. When, by the finger of the operator applied to the thumb-piece, the hammer is drawn slightly backward, the cam $i$ on the toe of the hammer is brought in contact with the under side of the cam $i'$ near the end of the trigger, and at the same time the pawl $n$ slips into the notch $j$ on the edge of the hammer, thus holding it at half-cock. The difference in position of the parts at half-cock, (seen in Figs 4 and 8,) is that in Fig. 4, where the half-cocking is done by trigger, the trigger has been drawn slightly backward and the cams $i$ and $i'$ have not come in contact with each other, while in Fig. 8, where the operation is effected by hammer, the trigger is very slightly drawn back and the cams $i$ and $i'$ are brought together. On the further retraction of the thumb-piece of the hammer its cam $i$, pressing upward against the cam $i'$ on the trigger, raises up the rear end of the trigger until the hammer-cam $i$ slips past the trigger-cam $i'$ and the trigger-cam $i'$ assumes its position under the hammer-cam $i$, as seen in Fig. 9, which is the point of full-cock. Now, the hammer cannot fall until the trigger is touched by the operator, when the piece will at once fire, as the further retrocession of the trigger effected by a slight touch causes the trigger-cam $i'$ to escape from under the hammer-cam $i$, and the hammer, being left unsupported, is forced down by the mainspring $o$, when the hammer and trigger occupy the relative position shown in Fig. 1. Here observe the difference in position of the parts in Figs. 5 and 9, in both of which the hammer is at full-cock and the trigger set in a drawn position. In Fig. 5 the trigger-cam $i'$ does not support the hammer-cam $i$, but the hammer is held at full-cock by the vibrating stud $r$, while in Fig. 9 the vibrating stud does not even touch the upper wall of its recess $q$ in the hammer. When the hammer has fallen, as in Fig. 10, the pressure of the operator's finger being removed from the trigger, it will regain its position, as in Figs. 7 or 3, ready for repeated action either by hammer or trigger.

It will be observed that the pawl $n$ does not in any case act as a driver or lifter to raise the hammer, but merely retains it at the point of half-cock to which it has been elevated by hand or by pulling the trigger.

It will also be evident from the description above given of the operation of the lifter $z$, by which the breech is rotated, and of the trigger spring-stop $g'$ and arbor-spring $k'$, that whenever the hammer is raised to full-cock, either by manipulating the hammer or the trigger, at the same time the breech is rotated the exact required distance, and is securely locked so as to prevent its moving either backward or forward, and at the same time the trigger is set in a drawn position, so that a slight touch will instantaneously fire the piece.

Having thus described my improvements in revolving-breech fire-arms, which I desire to annex to the Letters Patent granted to me on the 1st day of August, 1854, as an additional improvement thereon, what I claim as my invention, and desire to secure by Letters Patent, is—

1. The combination of the cam $i$ on the hammer and cam $i'$ on the trigger, constructed and arranged substantially as described, for the purpose of drawing back the trigger and retaining it and the hammer at the point of full-cock without the use of any pawl or catch to retain them in that position.

2. The use in fire-arms cocking as well by hammer as by trigger of a pawl, in combination with a notch on the front edge of the hammer, for the purpose of preventing the complete fall of the hammer and the discharge of the piece in case of the partial raising of the hammer or drawing of the trigger, substantially as described.

3. The combination and arrangement of the cam $i'$ and pawl $n$ on the trigger, and the cam $i$ on the hammer, and stud $r$ and lifter $z$ on the trigger, so that their conjoined action will effect the entire operation of the arm—viz., in half-cocking or full-cocking the hammer and rotating the breech into position—locking it, and setting the trigger in a drawn position preparatory to the discharge by the manipulation of either the hammer or the trigger.

4. The spring-stop on the arbor or spindle and ratchet-grooves in the bore of the cylinder, in which it works to prevent the backward rotation of the breech, in combination with the spring-stop on the hammer-spring and ratchet-grooves on the external circumference of the breech, in which it works to prevent the forward rotation of the breech, for the purpose, by their combined action, of perfectly locking the breech in position before the hammer reaches the point of full-cock by either mode of manipulation, preparatory to firing.

5. The lever and spiral spring in the trigger, combined and arranged as described, for the purpose of operating the vibrating stud.

JOSIAH ELLS.

Witnesses:
W. BAKEWELL,
MARTIN G. CUSHING.